Figure 1:
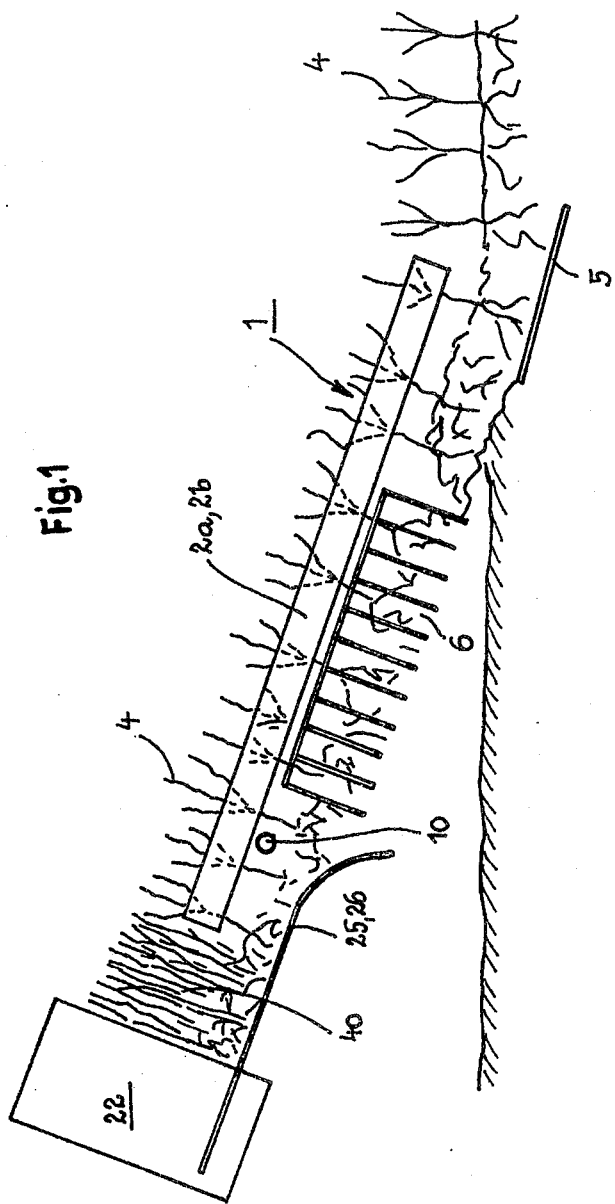

United States Patent [19]

Rath

[11] 4,037,666

[45] July 26, 1977

[54] APPARATUS FOR HARVESTING AND BUNDLING PLANTS

[76] Inventor: Karl Friedrich Rath, Farrach 8, Maria Rojach, Austria, A-9422

[21] Appl. No.: 641,636

[22] Filed: Dec. 17, 1975

[30] Foreign Application Priority Data

Dec. 23, 1974 Austria .................................. 10304/74

[51] Int. Cl.$^2$ ............................................. A01D 33/10
[52] U.S. Cl. ......................................... 171/61; 56/27.5
[58] Field of Search .................... 171/62, 61, 83, 110, 171/18, 124, 136; 56/27.5

[56] References Cited

U.S. PATENT DOCUMENTS

| | | | |
|---|---|---|---|
| 3,262,503 | 7/1966 | Zijlstra et al. | 171/61 |
| 3,743,024 | 7/1973 | Mayo et al. | 171/61 |
| 3,798,884 | 3/1974 | Middleton | 56/27.5 |

Primary Examiner—J. N. Eskovitz
Attorney, Agent, or Firm—Kurt Kelman

[57] ABSTRACT

Leafy and woody plants are harvested by holding the uprooted plants in a guided path while they are being removed. The uprooted and removed plants are classified and counted by a counter along the path to establish a minimum standard size to which the counter responds. The plants meeting this standard are counted until the number of the counted plants has reached a set number and the counted plants accumulate in a space between the end of the guided path and a packaging device. The counter is set to operate a forked element for moving the accumulated plants to the packaging device when the set number has been reached.

15 Claims, 3 Drawing Figures

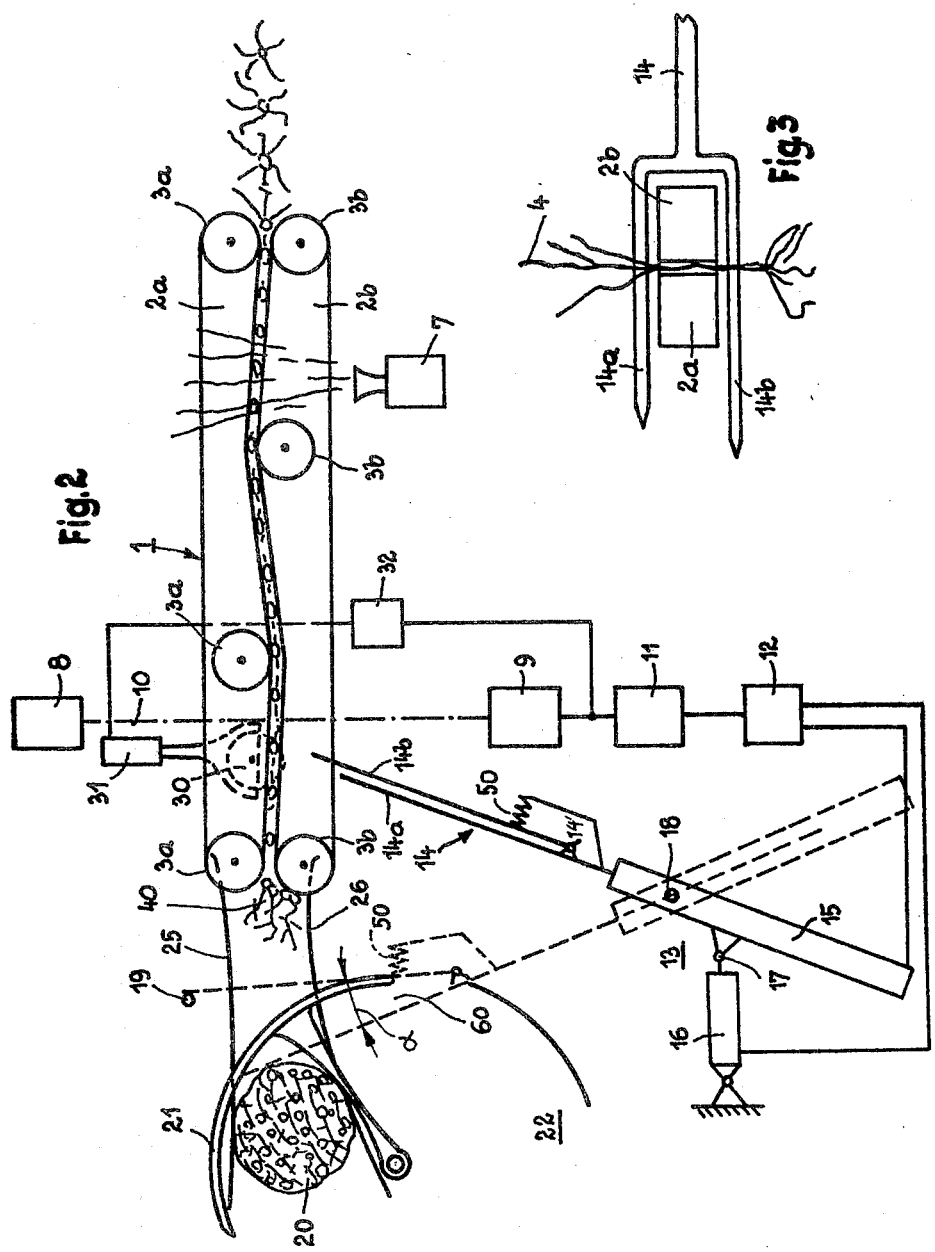

APPARATUS FOR HARVESTING AND BUNDLING PLANTS

The present invention relates to improvements in harvesting leafy or woody plants, such as saplings, wherein the plants are held in a guided path while being uprooted from the soil and removed therefrom.

In harvesting saplings from rows of planted rows of trees, the saplings are usually uprooted from the soil by a type of plowshare which lifts the saplings with their roots out of the coil, the dirt which clings to the saplings is removed, and the cleaned saplings are conveyed to a packing or unitizing device or are simply placed on the ground.

Before the harvested saplings are sold, they must be classified according to size, i.e. quality. This has been done manually, either as the daplings lie on the ground or, after they have been gathered into units, by cutting open the bundles of saplings and sorting them. The classified saplings are then manually counted and unitized again according to size. This procedure obviously involves a high cost in labor and is very time-consuming, in addition to which it does not produce optimum results. Harvesting of saplings cannot proceed before the snow has melted and the soil has dried out but, on the other hand, the harvest must be completed before the saplings develop new shoots, which will usually be about three weeks after the soild has sufficiently dried. Thus, the time available for completing the work is quite short, requiring massive manpower.

It is the primary object of this invention to provide an apparatus for harvesting such plants as saplings and to form them into units ready for sale, which proceeds fully automatically and provides an automatic quality control in unitizing set numbers of standardized plants ready for sale.

In the apparatus of the present invention, a plant uprooting and removal device sequentially uproots the plants from the soil and removes the uprooted plants along a guided path to an end of the path. A classifying and counting device is arranged in the path and is responsive to plants meeting a minimum standard. A plant packaging device is spaced from the end of the path to define an accumulating space for the removed and counted plants. The counting device is set to a limited number for accumulating the limited number of plants between the end of the path and the packaging device, and a means for moving the accumulated plants to the packaging device is operated by the counting device in response to the set number.

In this manner, all plants which do not meet the minimum standard are not counted. While these plants are also packaged, only the plants meeting the minimum standard are counted so that each package or unit contains the set number of plants which do meet the minimum standard of quality, i.e. size.

This has the disadvantage that a quality control must be effected at the point of destination, i.e. the packaged saplings which do not meet the minimum standard must be removed from the package. This may be avoided in accordance with a preferred embodiment of this invention by destroying those plants which are not counted, due to their failure to meet the minimum standard. This may be done, for instance, by cutting the roots off the trunk by arranging a steadily working cutter between the counting device and the end of the guide path, the cutter being stopped in response to each counted number of the plants for removing the cutter from the path for a time sufficient to permit each of the counted plants to pass the cutter.

The above and other objects, advantages and features of the invention will become more apparent from the following detailed description of a preferred embodiment thereof, taken in conjunction with the accompanying drawing wherein FIG. 1 is a schematic side elevational view of an apparatus according to the present invention;

FIG. 2 is a plan view of FIG. 1, on a different scale and also showing a means for moving the counted plants to a packaging device; and FIG. 3 is a plan view of an element of the moving means.

Referring now to the drawing and first to FIG. 1, saplings 4, which have been planted in a row, are lifted out of the soil and uprooted by plowshare 5 which is introduced obliquely into the soil to scoop up the saplings by their roots. This plant uprooting and removal device 1 for sequentially uprooting plants 4 from the soil and for removing the uprooted plants along a guided path to an end of the path comprises a pair of cooperating endless conveyor bands 2a, 2b which are respectively trained over pairs of rollers 3a, 3b, two facing courses of the conveyor bands defining a gap therebetween in which the trunks of the plants are gripped (see FIG. 2) to provide the guided path for the plant removal.

As the uprooted plants enter and pass through the guided path, dirt adhering thereto, such as soil, pebbles and the like, is removed from the roots and trunks by a blast of agitated air directed against the plants by blower 7 and by a reciprocatingly vibrating mechanism 6 through which the roots of the plants pass. If desired, only one of these dirt removing means may be used to clean the uprooted plants.

As the cleaned plants proceed along the guided path towards the end thereof, they pass through a light barrier comprised of light source 8 emitting light beam 10 across the path of the plants to be received by photosensitive element 9 which may be a photocell, a photo transistor or the like. Suitable aperture means (not shown) may be used to adjust the diameter of the light beam to a desired value.

According to one embodiment of this invention, the diameter of light beam 10 is adjusted to a value corresponding to a desired diameter of the trunk of plant 4 set as the minimum standard for the plants, this standard serving as a quality control. In this embodiment, all plants whose trunk diameter is smaller than the light beam diameter, i.e. which do not meet the minimum standard, will pass through the beam without completing interrupting it. If the interruption of the beam is used to control plant counting device 11, as will be described hereinafter, the plants which do not neet the set minimum standard determined by the beam diameter will not be counted.

Heretofore, it has been assumed that the height of the sapling is determinative of its quality. More recent research has shown, however, that the diameter of the trunk of the sapling is of greater importance than its height. The above-described embodiment takes this finding into account, the adjustment of the light beam diameter determining the quality control. However, the invention is not limited to this embodiment. If desired, the light beam may have a diameter substantially in excess of a minimum standard diameter of the plants to be counted, and the counting device may be operated by an adjustable light intensity meter. It may also provide a light beam of high intensity and having a diameter substantially smaller than a minimum standard diameter of the plants to be counted. In this case, a timer connects the light barrier to the counting device and times the passage of the plants past the light beam. The timer is set to operate the counting device in response to a set time of passage.

As shown in FIG. 2, photosensitive element 9 is connected to counting device 11. If, in the preferred embodiment, the light beam diameter has been adjusted to the desired minimum trunk diameter of the plants to be counted be device 11, the light beam will be fully interrupted by the passage of any plant whose trunk diameter is at least equal to the diameter of beam 10. When the photosensitive element thus receives no light, it will trigger the counting mechanism of device 11. This counting mechanism may be a continuous counter which continuously counts and adds the interruptions of the light beam and is set to a limit number. When the counting mechanism adds up to this limit number, it emits a control signal to operate solenoid valve 12 connected to the counting device. The counting mechanism then automatically returns to zero or any other selected setting to start a new counting cycle.

The illustrated control circuit also includes another solenoid valve 32 connected to counting device 11. This valve is kept open as long as light from light beam 10 is impinged on photosensitive element 9, i.e. if a plant having a trunk diameter less than the diameter of the beam passes through the light beam. Valve 32 is arranged in a pressure fluid line delivering hydraulic or pneumatic pressure to motor 31 whose piston rod caries cutter 30, i.e. a saw, extending into the path of the plants to cut the roots off the trunk and thus destroy the plants. In this way, all sub-standard plants will be destroyed while the interruption of the light beam by a plant meeting the minimum standard will cause photosensitive element 9 to close valve 32, thus interrupting pressure fluid delivery to motor 31. In the absence of pressure in the motor, a return spring or other suitable means will cause the piston rod of the motor to withdraw the cutter from the path of the plants so that all plants meeting the minimum standard will pass without being destroyed. A suitable time delay device may be used in the operation of valve 32.

The removed and counted plants accumulate in a space between end 40 of the cooperating conveyors 2a, 2b and a packaging device which is illustrated as bundling device 22, which space is defined between two fixed guides 25, 26 extending between end 40 and device 22. A means 13 for moving the accumulated plants to bundling device 22 comprises plant engaging fork 14 which, for reasons to be explained hereinafter, includes two parts, i.e. short tine 14a and longer tine 14b (see FIG. 3). Plant engaging element 14 is attached to the piston rod of pressure fluid operated motor 15 whose cylinder is pivotal about pivot 18. As previously indicated, the control signal emitted by counting device 11 operates solenoid valve 12 arranged in pressure fluid lines supplying pressure fluid, such as hydraulic or pneumatic pressure, to the cylinder of motor 15 for linearly moving fork 14 into the space between end 40 of the guided path and bundling device 22, and to the cylinder of motor 16 which is linked to the cylinder of motor 15 at a point remote from fulcrum 18 for subsequently pivotally moving the fork towards the bundling device, the movement from the rest into the operative position being shown in broken lines.

As can be seen in FIG. 3, during the linear forward movement of fork 14, the two conveyor bands 2a, 2b are located between the tines of the fork. The fork may also enter into the adjacent space between the end of the conveyor bands and the bundling device but it is necessary to provide a time delay for delaying the operation of motor 15 for a time corresponding to the time of passage of the counted plants from the counting device to the end of the path, i.e. the time it takes the last-counted plant to arrive from light barrier 8, 9, 10 at end 40 of the guided path. In this way, the entire number of counted plants will be moved by fork 14 to the bundling device. This time delay is essentially a constant built into the apparatus and forms part of the programming of valve 12.

Valve 12 is programmed to permit delivery of pressure fluid to motor 16 as soon as plant engaging element 14 has reached its end position in the linear movement into the pace between end 40 and bundling device 22 so that motor 15 is pivoted about fulcrum 18 into the position shown in broken lines in FIG. 2, the cylinder of motor 15 being linked to the piston rod of motor 16 at pivot 17. The pivoting movement proceeds at a speed approximating that of conveyor bands 2a, 2b so that for, 14 will grasp all the saplings delivered from end 40 of the conveyor path and will move the accumulated saplings between fixed guides 25, 26 to bundling device 22.

Stop 19, is arranged in the pivoting path of fork 14 to be engaged by longer fork part 14b in the end position of the fork while the other fork part 14a is pivoted through angle α in this end position to push the bundle of saplings forward, thus producing the end position of plant moving means 13 shown in broken lines in FIG. 2, in which gap 60 is defined between fork parts 14a and 14b to receive arcuate bundling member 21, which may be a needle or the like. When the bundling member is swung into position in gap 60, it also serves as a barrier against the succeeding accumulation of saplings between the conveyor end and the bundling device so that these succeeding plants do not become part of bundle 20. The two fork parts are linked together at pivot 14' to enable the pivoting of one part in relation to the other when the one fork part 14b is retained by stop 19 while the fork continues its pivoting movement through angle α.

After bundling of the counted saplings into bundle 20 has been completed, plant engaging element 14 is returned into its initial or rest position shown in full lines in FIG. 2, compression spring 50 causing the two fork parts to be pressed together again, this return movement being effectuated by suitable programming of valve 12 in delivering pressure fluid into the opposite cylinder chambers of motors 16 and 15 while the cylinder chambers to which pressure fluid was originally delivered are vented. Meanwhile, the conveyor 2a, 2b delivers another batch of counted saplings and the cycle of bundling is repeated.

If the light beam has a diameter which is much smaller than the minimum desired diameter of the trunks to be bundled and the beam is of high intensity, the counting device comprises a timer which measures the time of light interruption caused by each passing plant. The larger the diameter of the trunk of the plant, of course, the longer the time of light interruption. Thus, the minimum standard can be readily determined by a corresponding minimum time span of light interruption and when this minimum time span is measured by the timer in the counting device, thus indicating passage of a standard plant, a control signal is emitted by the counting device to operate valve 12 and also valve 32 in the same manner as the control signal hereinabove described.

If the light beam has a diameter substantially exceeding the minimum desired diameter of the trunks to be bundled, the operating valves are actuated by an output signal from photosensitive element 9 whose value exceeds that of the zero value of the light intensity.

While the packaging device for the quality-controlled and counted plants has been shown in FIG. 2 as a bundling device, the plants may be combined into units in other suitable manners. For instance, the unit of counted plants accumulated at the end of the conveyor path may be moved through guides 24, 26 by fork 14 into a container, for instance a box, placed at the end of the guides to receive the plants. The unit of plants also may be wrapped into a package.

I claim:

1. An apparatus for harvesting and bundling leafy or woody plants, which comprises a plant uprooting and removal device for sequentially uprooting the plants from the soil and for removing the uprooted plants along a guided path, to an end of the path, and the improvement of a classifying and counting means arranged in the path for responding to plants meeting a minimum standard of plant size and counting the plants meeting said minimum standard, a plant packaging device spaced from the end of the path to define an accumulating space for the removed and counted plants, and a means for moving the accumulated plants to the packaging device, responsive to the counting device reaching a predetermined set limit number for accumulating said limit number of plants in said space.

2. The apparatus of claim 1, further comprising a cutter means in the path between the counting device and the end of the path, and means responsive to each counted number of the plants for removing the cutter means from the path for a time sufficient to permit each of the counted plants to pass the cutter means.

3. The apparatus of claim 1, further comprising a light barrier means in the path for controlling the counting device.

4. The apparatus of claim 3, wherein the light barrier means includes a light beam traversing the path, the light beam having a diameter corresponding to a minimum standard diameter of the plants to be counted.

5. The apparatus of claim 4, further comprising aperture means for adjusting the diameter of the light beam.

6. The apparatus of claim 3, wherein the light barrier means includes a light beam traversing the path, the light beam being of high intensity and having a diameter substantially smaller than a minimum standard diameter of the plants to be counted, and a timer connects the light barrier means to the counting device, the timer timing the passage of the plants past the light beam and the timer being set to operate the counting device in response to a set time of passage.

7. The apparatus of claim 3, wherein the light barrier means includes a light beam traversing the path and having a diameter substantially in excess of a minimum standard diameter of the plants to be counted, and an adjustable light intensity meter for operating the counting device.

8. The apparatus of claim 1, wherein the means for moving the accumulated plants to the packaging device includes a plant engaging element, and pressure fluid operated means operative in response to the set number for nearly moving the moving means into the space between the end of the path and the packaging device, and subsequently pivotally moving the moving means towards the packaging device.

9. The apparatus of claim 8, wherein the plant engaging element is a fork.

10. The apparatus of claim 8, further comprising a valve controlling pressure fluid flow to the pressure fluid operated means, the valve being controlled by the set number of the counting device.

11. The apparatus of claim 8, further comprising time delay means for delaying operation of the pressure fluid operated means for a time coresponding to the time of passage of the counted plants from the counting device to the end of the path.

12. The apparatus of claim 8, wherein the packaging device is a bundling device and includes a movable bundling member, the plant engaging element includes two parts, a stop is arranged in the pivoting path of the moving means for engagement with one of the parts of the plant engaging element for determining an end position of the plant engaging element adjacent the bundling device, the two parts of the plant engaging element delimiting a space in the end position which separates the plants to be bundled from the plants accumulated at the end of the plant removal path, and the bundling member being movable into the thus delimited space.

13. The apparatus of claim 1, further comprising means in the path between the soil and the counting device for removing dirt from the uprooted and removed plants.

14. The apparatus of claim 13, wherein the dirt removing means includes an air blower.

15. The apparatus of claim 13, wherein the dirt removing means includes a plant vibrating device.

* * * * *